United States Patent

Maskovyak et al.

[11] Patent Number: 5,564,059
[45] Date of Patent: Oct. 8, 1996

[54] SIMPLIFIED PROTOCOL FOR EXPANDING A FIXED WIDTH BUS IN AN INDUSTRIAL CONTROLLER

[75] Inventors: George D. Maskovyak, Parma; John F. Dodds, Newbury, both of Ohio

[73] Assignee: Allen-Bradley Company, Inc., Milwaukee, Wis.

[21] Appl. No.: 575,005

[22] Filed: Dec. 19, 1995

Related U.S. Application Data

[63] Continuation of Ser. No. 265,544, Jun. 24, 1994, abandoned.

[51] Int. Cl.$^6$ .................................................. G06F 12/06
[52] U.S. Cl. ................ 395/800; 395/421.1; 364/DIG. 1; 364/255.1; 364/254; 364/251.5
[58] Field of Search ............................. 395/800, 200.13, 395/200.14, 200.16, 829, 285, 421.01, 421.02, 421.07, 421.1

[56] References Cited

U.S. PATENT DOCUMENTS

| | | | |
|---|---|---|---|
| 4,315,308 | 2/1982 | Jackson | 395/853 |
| 4,447,878 | 5/1984 | Kinnie et al. | 395/325 |
| 4,831,514 | 5/1989 | Turlakov et al. | 395/500 |
| 4,876,664 | 10/1989 | Bittorf et al. | 395/200 |
| 5,089,984 | 2/1992 | Struger et al. | 395/650 |
| 5,093,910 | 3/1992 | Tulpule et al. | 395/575 |
| 5,109,332 | 4/1992 | Culley | 395/325 |
| 5,162,986 | 11/1992 | Graber et al. | 364/146 |
| 5,303,353 | 4/1994 | Matsuura et al. | 395/325 |

*Primary Examiner*—Mehmet B. Geckil
*Attorney, Agent, or Firm*—Keith M. Baxter; John M. Miller; John J. Horn

[57] ABSTRACT

The present invention provides an efficient method of transferring multi-word data across a fixed width parallel bus normally transmitting a single word at a time by allocating part of the bus word to the transmission of a fractional address dividing the given addressing space into subaddresses or "fractional addresses". A data transfer request provides the desired fractional address and the data transfer response returns the fractional address value and the portion of the multi-word data corresponding to that fractional address.

6 Claims, 1 Drawing Sheet

SIMPLIFIED PROTOCOL FOR EXPANDING A FIXED WIDTH BUS IN AN INDUSTRIAL CONTROLLER

This is a continuation of application Ser. No. 08/265,544 filed Jun. 24, 1994, now abandoned.

FIELD OF THE INVENTION

The present invention relates to industrial controllers for the real-time control of industrial processes, and in particular, to a method of providing rapid transfer of multiple byte data on a fixed width bus used in such industrial controllers.

BACKGROUND OF THE INVENTION

Industrial controllers are special purpose computers used for controlling industrial processes and manufacturing equipment. Under the direction of a stored program, the industrial controller examines a series of inputs, reflecting the status of the controlled process, and changes a series of outputs controlling the industrial process. The inputs and outputs may be binary, that is on or off, or analog, providing a value within a continuous range.

An industrial controller differs from a conventional computer in two respects. First, unlike a computer, an industrial controller is normally customized to the particular process it is controlling both by writing control software stored in the controller's memory and by changing the hardware configuration of the controller itself.

The ability to reconfigure the hardware economically is provided by dividing the industrial controller into a number of functional modules each performing a different function. Different combinations of modules may be selectively linked together on a bus having multiple slots each having a unique slot address. A different functional module is placed in each slot to receive messages directed to that slot address.

The modules may include, for example, a processor, a power supply, one or more communication interfaces for communicating with high speed data links and input and output interfaces for receiving and transmitting input and output signals to the controlled process.

An industrial controller also differs from a computer in that data must be transferred to and from the processor at an extremely high speed so that real-time control may be maintained. Normally, the processor module controls communications on the bus, periodically scanning each module, asynchronously, in sequence, designating the module's slot address to read information from that module or to write information to the module. In order that each module can be ensured of a scanning within a given period of time, the amount of data transferred during a single scan to a slot address is normally limited to one word of length equal in bits to the number of parallel lines on the bus.

When it is desired to transfer a large amount of data between the processor module and a given functional module, this scanning process is too slow. Accordingly, in order to avoid the need to wait for repeated scans to transfer multi-word data, it is known to use a block transfer protocol wherein a special block transfer character is used to initiate a serial transfer of data between the processor and the given functional module that may interrupt the scanning process.

Although a block transfer is an efficient means of transferring large amounts of data, like any such sequential transfer, it requires a certain amount of overhead for this type of transmission, such as control data indicating the length of the transfer, the start of the transfer and error checking data added after the transfer.

For the transfer of data that is on the order of two or three words, this overhead prohibitively affects the speed with which the data is transferred. In these cases it is known to use modules that cover multiple slot addresses so that a single scan can transfer multiple words of data to the module via the multiple addresses. In this case, the module will have more than one physical slot address.

With advances in the functional capability of modules, greater capacity for data transfer may be needed. Thus older versions of a module that required only single words of data transfer may be replaced with modules requiring multiple word transfers. For example, later version temperature control modules may provide more data than can be transferred in a single scan of that module.

When such an upgrade in modules is desired, a block transfer to accommodate the extra data to be transferred is prohibitively slow. Yet the solution of using multiple slot addresses is not always available. Considerable investment may have been made in the existing program both in original development costs and in the testing that established its reliability. Because such programs make direct reference to the slot addresses of the modules providing input and output to the program, having the new module usurp multiple slot addresses would require extensive and expensive rewriting of this program.

Thus, the need exists for a method of transferring multi-word data in an asynchronous scanning system that does not require a block transfer-like mechanism nor require the use of additional slot addresses on the bus.

SUMMARY OF THE INVENTION

The present invention provides a way of transferring a small amount of additional data on a fixed width bus without the need for invoking a block transfer or using additional bus addresses.

Generally, the data to be transferred is broken into portions, each smaller than a bus word, that may be transferred over the bus after being concatenated to a "fractional" address indicating what portion of the multi-word data is being transferred. The fractional address provides effective additional address space between the addresses of the slots permitting the desired data to be transmitted in separate portions each clearly identified by its fractional address.

Specifically, the method provides for the transmitting of multi-word data from a module that exceeds in size an amount that can be transmitted in parallel on a fixed width bus. During a first read/write cycle of the module, the functional module presents to the bus a word including a first portion of the multi-word data and a first fractional address. During a later read/write cycle, the functional module presents to the bus a word including a second portion of the multi-word data and a second fractional address different from the first fractional address.

Thus, it is one object of the invention to provide for the reliable transfer of multiple data words without the overhead required of a normal sequential multi-byte transmission by block transfer. Each portion of the multi-word data is clearly identified by a fractional address and thus there is no need to confirm word size or the stop and start of sequential multi-byte transmission as is normally required in such protocols.

Prior to the functional module presenting the first portion of the multi-word data, the functional module may present to the bus a bus word including a null fractional address indicating that the multi-word data is not yet available.

Thus, it is another object of the invention to provide for the transfer of multi-word data in an asynchronous bus where the functional module does not know when the read/write by the industrial controller will occur. The null address prevents a premature using of the output of the functional module prior to multi-word data being available. The assigning of each portion of the multi-word data with a unique fractional address prevents the need for precise timing of the reads of the industrial controller with the writing by the functional module. Multiple reads of a single portion of the multi-word data will be identified by the same fractional address and thus be recognized as redundant.

It is another object of the invention to provide a method of transferring multi-word data that is consistent with the existing protocols of the industrial controller, such protocols which may be executed by hardware that is not easily modified. In the present invention, the multi-word data is transferred along the bus like normally scanned single word data. After the data is received and decoded by hardware, it may be reassembled by means of the fractional address via software routines.

During a first read/write cycle, the controller may transmit to the functional module a bus word including the fractional address of the portion of the multi-word data that is desired to be received by the controller and the functional module may respond by presenting that portion of the multi-word data to the bus.

It is thus another object of the invention to provide a method of transferring multi-word data where no separate signal is needed to indicate to the functional module that the next portion of the multi-word data is required. Functional modules, by monitoring the fractional address provided by the controller, can determine whether the controller has, in fact, read the previous portion of the multi-word data.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

DETAILED DESCRIPTION OF THE PREFERRED EMBODIMENT

Figure 1:
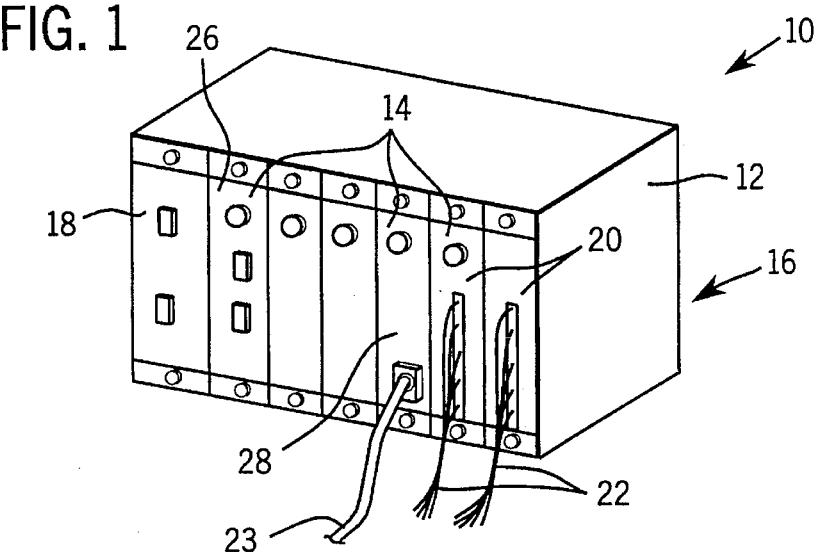
FIG. 1 is a simplified perspective view of an industrial controller having multiple functional modules contained in several racks joined by a bus to a processor module.

Referring to FIG. 1, an industrial controller 10 suitable for use with the present invention provides a rack 12 forming a generally open sided box. The rack 12 receives a number of functional modules 14 within its volume so that the modules are electrically interconnected by a backplane bus 16. As is known in the art, the bus 16 generally comprises a set of parallel conductors which run along the back of the rack 12 to be connected to the individual modules 14 by connectors (not shown).

The modules 14 may be individually removed from the rack 12 for repair or replacement or to allow custom configuration of the industrial controller 10. The modules 14 within the rack 12 may include, for example, a power supply module 18, a processor module 26, one or more input/output (I/O) modules 20 and a temperature control module 28. Power supply module 18 receives an external source of power (not shown) and provides regulated voltages to the other modules 14 by means of conductors on the bus 16.

I/O modules 20 provide an interface between inputs from and outputs to external equipment (not shown) via cabling 22 attached to the I/O modules 20 at terminals on their front panels. Temperature control module 28 receives inputs from numerous thermocouples via cabling 23 at a connector on its front panel. As is understood in the art, the I/O modules 20 and the temperature control module 28 convert input signals on the cables 22 and 23 respectively to digital words for transmission on the bus 16. The I/O modules 20 also convert other digital words from the bus 16 to the necessary signal levels for control of the equipment.

The processor module 26 processes information provided by the I/O modules 20 and the temperature control module 28 according to a stored program and provides output information to the I/O modules 20 to control equipment in response to the stored program and the received input messages.

Figure 2:
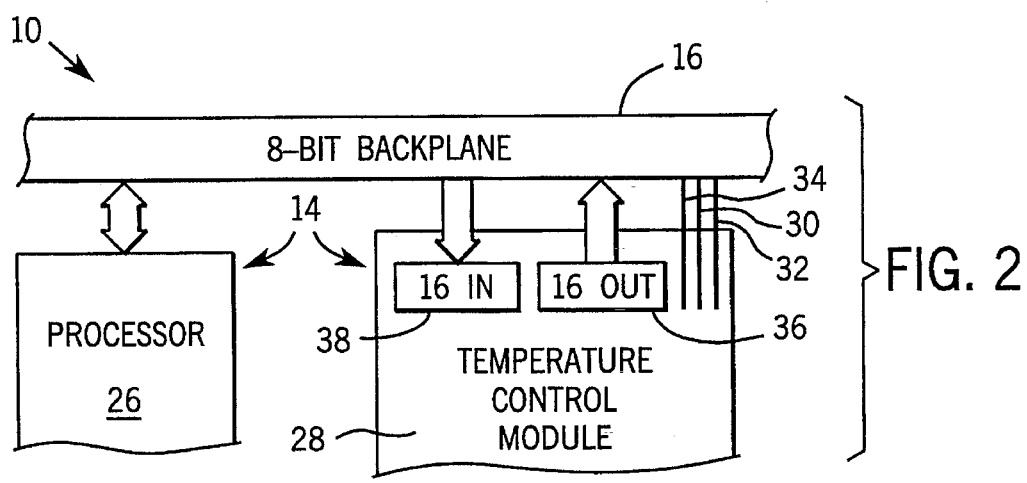
FIG. 2 is a schematic block diagram of the industrial controller of FIG. 1 showing the path of data through the bus from the processor to a temperature control module having a sixteen bit input register and a 16 bit output register but needing to transfer more than 16 bits of data.

Referring now to FIG. 2, the bus 16 provides for the parallel transmission of eight bits of data together with certain address lines, control lines and power lines for each of the functional modules 14. The temperature control module 28 occupies two slot addresses and thus receives eight data lines for each of the addresses.

The temperature control module 28 also receives three control lines: a read/write line 30 that indicates whether a read or a write is occurring under the control of the processor 26, an $A_0$ line 32 which indicates the least significant bit of the address of the slot, thus whether the read/write is occurring at the first or second of the slot addresses occupied by the temperature control module 28, and a decoded slot enable line which indicates that the temperature control module is being addressed. The slot enable line 34 represents a decoded slot address as will be generally understood in the art.

The modules 14 are scanned by the processor 26 which changes the slot address on the bus after each write/read cycle so as to move through each of the slot addresses sequentially. During a single scan, an eight bit word of data may be transferred from the bus 16 to the module 14 during the write portion of the write/read cycle and an eight bit word may be transmitted to the bus 16 from the module 14 during a read portion of the write/read cycle. Such bus transfers and the circuitry to accomplish the same are well known in the art.

Because the temperature control module 28 communicates with two slot addresses, in a single scan, eight bits of the temperature control module 28 can be written to and then eight bits can be read from its first slot address. Then, in the same scan, eight bits can be written to and eight bits can be read from the second slot address. Effectively, and as depicted, the temperature control module may be considered to read and write a word of 16-bits.

Figures 3, 4, 5:
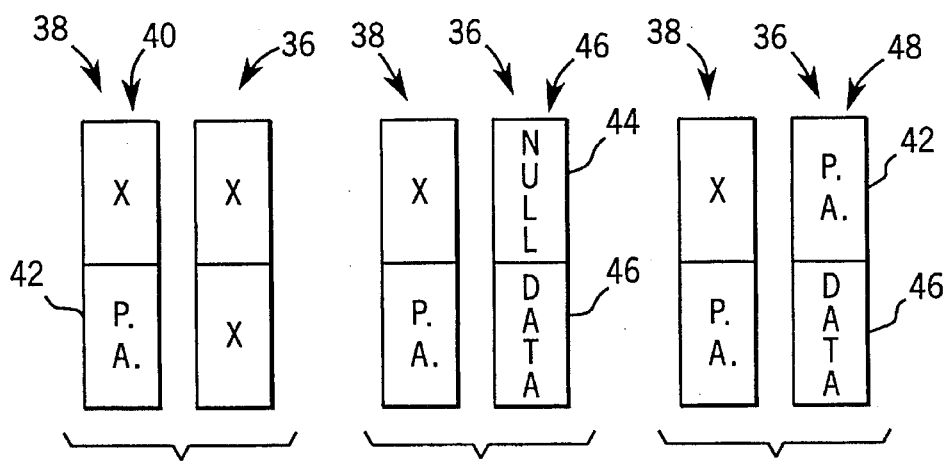
FIGS. 3, 4 and 5 are diagrams of the contents of the input and output registers during the transfer protocol of the present invention.

Referring to FIGS. 3, 4 and 5, transfer of multiple words of data on the bus 16 is accomplished through a handshake procedure between the processor 26 and the temperature control module 28 in which a fractional address is developed providing, effectively, address bits of lower significance than a zero, i.e., fractional addresses that allow the two addresses of the temperature control module 28 to be expanded to up to 64 subaddresses. However, for the purpose of the temperature control module 28, only two additional subaddresses are required to fully transfer the multi-word data from the temperature control module 28.

The transfer is accomplished by the processor 26 first transmitting to the temperature control module 28 a 16 bit word 40 with the least significant eight bits having an arbitrary value indicated by the "X" (don't care) of the register shown in FIG. 3 and the most significant eight bits having the fractional address designating the subaddress from which data is required. In the present example, the fractional address will be zero initially.

The temperature control module 28, monitoring the input register 38, detects the presence of a new fractional address 42, if any, and responds, as shown in FIG. 4, by placing a null address 44 in an output word 46 presented to the output register 36. The null address 44 insures that an asynchronous reading by the processor 26 of the output word 46 of register 36 does not result in the capture of erroneous data based on a possible ongoing transition of the data within the 16 bits of the output register 36. The null address 44 is interpreted by the processor 26 as indicating that valid data is not yet available.

After the null address 44 is placed in the output register 36, data comprising the least significant eight bits of the desired multi-word output word 46, corresponding to the subaddress indicated by the fractional address 42, is placed in the least significant bits of the output register 36. Because the least significant eight bits of the output word 46 is still the null address 44, this output word 46 is not found as valid in intervening scans of the processor 26 of the output register 36.

Finally, as indicated in FIG. 5, the fractional address 42 first presented to the temperature control module 28 by the processor 26, is placed in the lower eight bits of the output word 48 in the output register 36, with the upper eight bits still containing the desired data associated with that fractional address 42. A subsequent scan by the processor 26 reading the output register 36 will capture this data after and determine that the presented fractional address 42 matches that originally provided by the processor.

This process is then repeated with the processor 26 this time providing the fractional address of one, and the temperature control module 28 responding with the most significant part of the multi-word data.

Thus, the address space that may be read by the processor 26 has been effectively expanded through the allocation of certain portions of the output register 16 to addressing tasks thereby creating fractional addresses providing additional values within the pre-existing address scheme without changing other address values of other modules 14.

This means that the particular control algorithms need not be revised to provide more address space for the new temperature control module 28 permitting previously written code, incorporating those addresses, to accept the upgrade of a temperature control module 28.

It will be understood that the amount of the output words 46 and 48 devoted to the fractional address may be less than eight bits and, in fact in the preferred embodiment, is limited to four bits so that two bits may be reserved for other purposes such as to indicate a true block transfer as distinguished from the protocol of the present invention. Further, some of the bits allocated to the fractional address may be returned for use in transmitting data if it is known that the large number of fractional addresses provided by the eight bits is not required. Thus, if only four fractional addresses are required, additional bits may be devoted to data transfer.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

I claim:

1. In an industrial controller having a central scanning unit communicating with at least one remote functional module during a write/read cycle, the scanning unit writing to the functional module by way of a bus having a number of parallel lines and a functional module input register and reading from the functional module by way of the bus and a functional module output register, the data being transferred between the scanning unit and the functional module in bus words, each bus word including a number of bits determined by the number of parallel bus lines, a method of transmitting a data word consisting of a number of bits which exceeds the number of bits in one bus word, the data word having portions including a first and a second portion, the method comprising the steps of:

(a) during a first write/read cycle:
  (i) transmitting a first word to the functional module input register designating a first fractional address wherein the first fractional address designates the first portion of said data word;
  (ii) detecting the first word and concatenating the first fractional address and the first portion to form a first bus word;
  (iii) placing the first bus word in the output register; and
  (iv) capturing the first bus word for use by the scanning unit; and b) during a second write/read cycle which follows the first write/read cycle:
  (i) transmitting a second word to the functional module input register designating a second fractional address wherein the second fractional address designates the second portion of said data word and is different than the first fractional address;
  (ii) detecting the second word and concatenating the second fractional address and the second portion to form a second bus word;
  (iii) placing the second bus word in the output register; and
  (iv) capturing the second bus word for use by the scanning unit.

2. The method of claim 1 wherein steps (a)(iii) and (b)(iii) are each proceeded by the step of:

(c) placing a bus word including a null fractional address in the output register indicating that a portion of the multi-word data is not yet available.

3. The method of claim 2 wherein the null fractional address is zero.

4. In an industrial controller having a central scanning unit communicating with at least one remote functional module during a write/read cycle, the scanning unit writing to the functional module by way of a bus having a number of parallel lines and a functional module input register and reading from the functional module by way of the bus and a functional module output register, the data being transferred between the scanning unit and the functional module in bus words, each bus word including a number of bits determined by the number of parallel bus lines, a method of transmitting a data word consisting of a number of bits which exceeds the number of bits in one bus word, the data word having portions including a first and a second portion, the method comprising the steps of:

(a) during a first write/read cycle:
   (i) transmitting first word to the functional module input register designating first fractional address wherein the first fractional address designates the first portion of said data word;
   (ii) where the first portion of said data word is not yet available, placing a bus word including a null fractional address in the output register;
   (iii) where the first portion of said data word is available:
      concatenating the first fractional address and the first portion to form a first bus word;
      placing the first bus word in the output register; and
      capturing the first bus word for use by the scanning unit; and (b) during a second write/read which follows the first write/read cycle:
   (i) transmitting a second word to the functional module input register designating a second fractional address wherein the second fractional address designates the second portion of said word and is different than the first fractional address;
   (ii) where the second portion of said data word is not yet available, placing a null fractional address indicating that a potion of the multiword data is not yet available in the output register;
   (iii) where the second portion of said data word is available:
      concatenating the second fractional address and the second portion to form a second bus word;
      placing the second bus word in the output register; and
      capturing the second bus word for use by the scanning unit.

5. The method of claim 4 wherein the null fractional address is zero.

6. The method of claim 5 wherein the write/read cycle of the functional module includes a first read of an output register of the functional module of the first address and a first write of an input register of the functional module at the first address followed by a second read of the output register at a second address and a second write of the input register at the second address.

* * * * *